United States Patent Office 2,767,141
Patented Oct. 16, 1956

2,767,141

FIRE EXTINGUISHING COMPOSITIONS

Arthur F. Ratzer, Chatham, N. J., and David Levin, Philadelphia, Pa., assignors to Pyrene Manufacturing Company, Newark, N. J., a corporation of Delaware No Drawing. Application April 4, 1952,
Serial No. 280,640

20 Claims. (Cl. 252—8.05)

The present invention relates to liquid foam stabilizing compositions capable of forming stable fire extinguishing foams with water and a gas, the method of preparing such substances and the method of forming fire extinguishing foam from such compositions.

It is an object of this invention to provide a foam stabilizing composition which can be prepared and stored in concentrated solutions and which upon dilution with water produces a high yield of very stable foam.

It is also an object of the invention to provide a foam stabilizing composition which may be used to prepare fire extinguishing foams which under conditions of use are of improved resistance and stability to hydrocarbon substances, but more particularly, to alcohol and other solvents of a lyophilic nature.

It is a further object of the invention to provide a stable foam producing composition of optimum quality and which is not corrosive to containers made of steel or other metals.

Further objects and advantages of this invention will be apparent and will be explained in connection with the description which follows.

Numerous proteinaceous materials including certain degradation products of proteins have been suggested and are well known for the production of fire extinguishing foams. Certain water-soluble proteinaceous degradation foaming agents obtained from the alkaline degradation of substances, such as the keratins, albumens, globulins, hemoglobins and seed-meal proteins, such as obtained from cotton seed meal and peanut cakes, have been used with a high degree of success in the production of foams for extinguishing fires of lyophobic hydrocarbon substances. These latter proteinaceous substances, their preparation and the production of stable foams utilizing these substances are the subject matters of U. S. Patents 2,324,951, 2,361,057, 2,368,623, 2,481,875 and 2,405,438, of which one of us is a patentee in each instance. Other water-soluble degraded protein foaming agents which are known are the proteins degraded by certain procedures using alkali-metal hydroxides or ammonia. While these substances are excellent for use in extinguishing lyophobic hydrocarbon fires, they are not so satisfactory for use in air foams for fires involving alcohols or other lyophilic solvents.

Attempts have been made to improve the stability of foam stabilizers used on alcohol fires. One such foam stabilizer is described in Daimler Patent No. 2,232,053, issued February 18, 1941. However, it is difficult, if not impossible, to prepare satisfactory foams by the procedure disclosed in this patent. At best, these products are corrosive, not very stable, prone to form sludge and decompose upon storage, and give only low expansion foam when used in conventional air foam equipment.

We have discovered a stable foam stabilizing material which is highly satisfactory in producing foams for fighting fires of lyophilic or hydrophilic solvents, such as the lower alcohols and ketones, etc., as well as the lyophobic solvents. Our compositions produce foams in which the hydrophilic solvent does not break down the bubble wall of the foam. This provides the public with a composition which is equally satisfactory in combating fires of either lyophobic and lyophilic substances. The foams produced not only have higher stability to hydrophobic materials, such as oils and gasoline, than do those of the prior art compositions, but they also have unique stability and resistance to hydrophilic materials, such as alcohols and ketones. In addition, our compositions are not corrosive to containers made of steel or other metals. They are quite stable under normal conditions of storage and are not subject to sludge formation. They have desirable foam expansion properties producing in conventional foam forming equipment foam values of 8 to 10 times the volume of the dilute aqueous solution after final dilution with water. Also of particular importance is the high degree of stability of the foam produced from our compositions. The foam is so stable that it is almost permanent. The rate of water separation from the foam produced is much lower than that of the prior art and this contributes heavily to the stability of the foam.

Our invention comprises a unique and novel composition having optimum foam producing properties for combating fires of both lyophobic and lyophilic combustible material. Essentially our composition contains a concentrated aqueous solution of a water-soluble degraded protein foaming agent, a water-soluble metal salt, a fatty acid and selected amines which will both saponify the acid and form a soluble complex with the metal salt.

Water-soluble degraded protein foaming agents which may be utilized in the compositions of our invention are any protein degradation or hydrolytic products selected from this well known class of foaming agents. The foam fire extinguishing art is familiar with this class of materials. One suitable group of degraded protein foaming agents are those disclosed in the U. S. patents to either of us, Nos. 2,324,951, 2,361,057, 2,368,623, 2,481,875 and 2,405,438. The desirable methods of producing these proteinaceous degradation products are also disclosed in these patents. These degradation products are those obtained by hydrolyzing a protein selected from the class consisting particularly of keratins, albumens, globulins, hemoglobins, and seed-meal proteins with an alkaline compound selected from the class consisting of oxides and hydroxides of the alkaline-earth metals and magnesium. Examples of these suitable proteinaceous substances are the hydrolytic products of pea flour, maize flour, soya bean meal, cottonseed cake, peanut cake, horn or hoof meal, seed meals, nut meals, fish scales, feathers, wool waste, hair waste and dried blood or mixtures of these materials.

We contemplate using the above water-soluble protein degradation foaming agents in the form of a salt of an alkali-metal. We wish to include the ammonium ion in the definition of alkali-metal. We have discovered that the salts of the alkaline-earth metals, such as calcium, are not as satisfactory for use in our invention if used in such a way as to form insoluble calcium salts. We prefer first to remove the alkaline-earth metals by treating a concentrated solution of the alkaline-earth metal protein-degradation material with an alkali-metal carbonate. Alkali-metal salts of other acids which will precipitate the alkaline-earth metals in the presence of the proteinaceous solution may be used instead of the carbonate. Examples are the phosphate and oxalate salts. The insoluble alkaline-earth metal carbonate then produced is filtered off and the filtrate after concentration is used in preparing our compositions. It is desirable to concentrate the protein solution to about 50% by weight of solids. We have discovered that the sodium salt gives the best results but the potassium, ammonium and other alkali-metal salts are also highly satisfactory.

As the water-soluble metal salt, we prefer to use such salts as those of zinc, copper and cadmium. To date, our best results have been obtained using zinc salts, such as the chloride. We contemplate the use of any metal salt which will form a clear solution with the amine and the fatty acid used and which does not precipitate when mixed with the alkali-metal water-soluble degraded protein foaming agent. The metal used is one which will produce an insoluble soap with the fatty acid alone and which will be solubilized by the addition of one of the selected group of amines of the invention. We contemplate a range of concentration of metal salt depending upon the ultimate stability one wishes to obtain. This is determined by the rate of water drainiage from the foam produced. With the use of zinc salts, we find that compositions containing a range of 1 to 8% by weight of zinc are satisfactory and concentrations of from 3 to 5% by weight of zinc are preferred.

We contemplate as the best fatty acids for use in our compositions, those saturated, naturally-occurring and synthetic acids having a range of from 6 to 12 carbon atoms. Most satisfactory results were obtained with acids having 8 to 10 carbon atoms. Those acids having less than 8 carbon atoms form less stable foams and those having more than 10 carbon atoms give rather viscous and cloudy compositions due to the lower solubility of their metallic salts. The acids containing an odd number of carbon atoms produced synthetically show no particular advantages over the naturally-occurring even numbered carbon atom acids. Due to their general availability, the naturally-occurring acids are preferred. We have found that for optimum results, the fatty acid should consist of from 2 to 12% by weight of the finished product and preferred results are obtained with compositions containing 5 to 8% of fatty acid. Most desirable results are obtained with compositions containing about 6% by weight of fatty acid.

We contemplate for use in our invention certain classes of amines. Preferred results have been obtained with the alkanolamines, particularly the lower alkanolamines. For example, monoethanolamine has been found to be the best amine for use in the invention. Diethanolamine and triethanolamine have also been found to be highly satisfactory. Monoethanolamine and diethanolamine are the preferred alkanolamines for practical results. Due to its lower molecular weight, the monoethanolamine may be used in less quantity than the other amines. Other alkanolamines which may be used are the propanolamines and isopropanolamines. Also, primary aliphatic amines, alkylenediamines and polyalkylenepolyamines and morpholine may be used satisfactorily. As examples of substances coming within this group are isopropanolamine, butylamine, hexylamine, ethylenediamine, propylenediamine and tetraethylenepentamine. We have found that the secondary and tertiary amines do not perform satisfactorily in preparing compositions according to the invention. Due to idiosyncracies, certain mixtures of amines, fatty acids and metallic salts do not produce a clear solution on warming, in which case, it is probable that that particular combination will not produce a stable finished composition and it is advisable that an alternate mixture be used.

Our invention also comprises a unique process for preparing the compositions according to the invention. The general procedure is as follows: The amine is introduced into a heated tank. The fatty acid is added with stirring. Following the addition of the fatty acid, there is also added with stirring a concentrated aqueous solution of the metal salt. The reaction vessel is heated during this reaction to hasten saponification. If the mixture produced is not clear, it is necessary that it be heated further to clarify the solution. If the mixture does not clarify on further heating, additional amine should be added until a clear solution is obtained. The clear mixture prepared above is then added to a concentrated solution of an alkali-metal salt of the degraded protein material. We prefer that the amine be present in the composition in the minimum concentration required to obtain a clear mixture. By the use of the above order of addition of materials, we find that we obtain excellent results.

As has been stated above, the minimum concentration of amine is that quantity necessary to neutralize and solubilize the fatty acid and the metal salt. The amount of amine to be used is dependent upon the quantities of fatty acid and metal salt and also, the particular amine, fatty acid and metal salt combination used. The amount of amine required to solubilize the metal salt and the fatty acid is not necessarily the stoichiometric equivalent weights of the reactants. While the minimum and optimum amount of amine is that amount necessary to produce a clear solution, the maximum amount which may be tolerated is less clearly defined and will vary in accordance with the particular amine used. In general, an excess of the amine will tend to decrease the stability of the foam produced in proportion to the excess of amine used. This difficulty arises with large excesses of amine because the complex formed will not precipitate upon being diluted with water at the time of foam formation. Such precipitation is necessary to obtain a foam of good fire resistance. Amounts in excess of the minimum concentration required, up to an excess of 20%, may be employed without untoward results.

The compositions according to the invention are particularly useful for producing air foam for fire extinguishing purposes, and for this purpose may be added in a proportioned amount to a stream of water. The stream of water carrying the foam stabilizing composition may then be divided into one or more jets for aspirating air and producing the foam. The compositions according to the invention may also be added to the water simultaneously with or just subsequent to the incorporation of the air therein.

In order more clearly to disclose the nature of the present invention, specific examples illustrating the preparation of typical compositions will hereinafter be described. It should be understood, however, that this is done solely by way of example and is intended neither to delineate the scope of the invention nor limit the ambit of the appended claims.

*Example 1*

About 18 cc. of monoethanolamine is introduced into a heated vessel. 6 cc. of caprylic acid are added with stirring. To this mixture is then added 15 cc. of a 75% wt./vol. solution of zinc chloride. The mixture is heated until a clear solution is obtained. The clear solution obtained is then added with stirring to 61 cc. of a concentrated aqueous solution of about 50% by weight of a sodium salt of the hydrolyzed protein obtained from horn and hoof meal obtained in accordance with Ratzer U. S. Patent 2,324,951.

*Example 2*

About 17 cc. of diethanolamine is introduced into a heated vessel. 6 cc. of nonylic acid are added with stirring. To this mixture is then added 10 cc. of a 75% wt./vol. solution of zinc chloride. The mixture is heated until a clear solution is obtained. The clear solution obtained is then added with stirring to 65 cc. of a concentrated aqueous solution of about 50% by weight of a sodium salt of the hydrolyzed protein obtained from cottonseed cake obtained in accordance with Levin U. S. Patent 2,405,438.

*Example 3*

About 14 cc. of n-butylamine is introduced into a heated vessel. 3 cc. of caprylic acid and 3 cc. of capric acid are added with stirring. To this mixture is then added 10 cc. of a 75% wt./vol. solution of zinc chloride.

The mixture is heated until a clear solution is obtained. The clear solution obtained is then added with stirring to 70 cc. of a concentrated aqueous solution of about 50% by weight of a sodium salt of a hydrolyzed protein product, such as is utilized in either Examples 1 or 2.

Example 4

About 10 cc. of ethylenediamine is introduced into a heated vessel with 1½ cc. of caprylic acid and 4½ cc. of capric acid with stirring. To this mixture is then added 15 cc. of a 75% wt./vol. solution of zinc chloride. The mixture is heated until a clear solution is obtained. The clear solution obtained is then added to 69 cc. of a protein concentrate, such as that used in Examples 1 or 2.

Example 5

About 15 cc. of monoethanolamine is introduced into a heated vessel with 6 cc. of caprylic acid. To this mixture is then added 12 cc. of a 75% wt./vol. solution of cadmium chloride. The mixture is heated until a clear solution is obtained. The clear solution obtained is then added with stirring to 67 cc. of a protein concentrate, such as that used in Examples 1 or 2.

For practical purposes, it is desirable that the compositions prepared in the above examples be as concentrated as possible with respect to the materials contained in the solution. The more concentrated is the solution, the greater is the dilution with water which may be practiced at the time the foam is produced. As a corollary, greater savings in storage space may be obtained from more concentrated compositions. The foam producing compositions of the invention may be diluted with water at the time the composition is to be used for extinguishing fire or sooner in conformance with standard practice in foam fire-extinguishing. The foam is produced by aerating the diluted aqueous mixture with a foam playpipe such as is standard equipment in the art.

In practicing the water dilution of the compositions of the invention, no definite amount of dilution is required. It is the general practice in the art to dilute the solution with enough water to form a 6% of composition in water mixture. However, other varying concentrations may be used.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What we claim is:

1. A foam stabilizing composition suitable for the preparation of fire extingushing foams consisting essentially of an aqueous solution of water-soluble degraded protein foaming agents which are alkali-metal salts of hydrolysis products obtained by hydrolyzing a protein selected from the class consisting of keratins, albumens, globulins, hemoglobins and seed meal proteins by means of an alkaline compound selected from the class consisting of oxides and hydroxides of the alkaline-earth metals and magnesium followed by replacing the alkaline-earth metal and magnesium introduced by the alkaline compound with an alkali-metal to form the alkali-metal salts of the hydrolysis products and a complex salt prepared from the reaction product of 1 to 8% of a metal introduced as a water-soluble metal salt, 2 to 12% of a fatty acid containing from 6 to 12 carbon atoms and an amine selected from the class consisting of an alkanolamine, a primary aliphatic amine, an alkylenediamine, a polyalkylenepolyamine and morpholine; said water-soluble metal salt being of a metal which forms a water-insoluble soap with said fatty acid, which mixture of the water-soluble metal salt and fatty acid is first separately solubilized in the water in which the water-soluble metal salt is dissolved prior to being mixed with the fatty acid by the addition of one of said amines; said amine being present in sufficient quantity to solubilize the fatty acid and water-soluble metal salt in the water in which the water-soluble metal salt is dissolved before being admixed with the fatty acid and amine and the resulting water-soluble complex introduced into said final foam stabilizing composition but in less than such excess as will prevent the precipitation of the foam-stabilizing composition when it is diluted with substantial quantities of water; the quantity of said water-soluble degraded protein foaming agents being such as will produce a foam when said foam-stabilizing composition is diluted with a sufficient quantity of water to produce a mixture of about 6% of said composition in water and the resulting mixture aspirated with air.

2. The novel foam stabilizing composition defined in claim 1, wherein the alkali-metal salts of hydrolysis products are the sodium salts.

3. The novel foam stabilizing composition defined in claim 1, wherein the alkali-metal salts of hydrolysis products are the potassium salts.

4. A foam stabilizing composition suitable for the preparation of fire extinguishing foams consisting essentially of an aqueous solution of water-soluble degraded protein foaming agents which are alkali-metal salts of hydrolysis products obtained by hydrolyzing a protein selected from the class consisting of keratin, albumens, globulins, hemoglobins and seed meal proteins by means of an alkaline compound selected from the class consisting of oxides and hydroxides of the alkaline-earth metals and magnesium followed by replacing the alkaline-earth metal and magnesium introduced by the alkaline compound with an alkali-metal to form the alkali-metal salts of the hydrolysis products and a complex salt prepared from the reaction product of 1 to 8% of a metal introduced as a water-soluble metal salt, 5 to 8% of a fatty acid containing from 6 to 12 carbon atoms and an amine selected from the class consisting of an alkanolamine, a primary aliphatic amine, an alkylenediamine, a polyalkylenepolyamine and morpholine; said water-soluble metal salt being of a metal which forms a water-insoluble soap with said fatty acid, which mixture of the water-soluble metal salt and fatty acid is first separately solubilized in the water in which the water-soluble metal salt is dissolved prior to being mixed with the fatty acid by the addition of one of said amines; said amine being present in sufficient quantity to solubilize the fatty acid and water-soluble metal salt in the water in which the water-soluble metal salt is dissolved before being admixed with the fatty acid and amine and the resulting water-soluble complex introduced into said final foam stabilizing composition but in less than such excess as will prevent the precipitation of the foam-stabilizing composition when it is diluted with substantial quantities of water; the quantity of said water-soluble degraded protein foaming agents being such as will produce a foam when said foam-stabilizing composition is diluted with a sufficient quantity of water to produce a mixture of about 6% of said composition in water and the resulting mixture aspirated with air.

5. A foam stabilizing composition suitable for the preparation of fire extinguishing foams consisting essentially of an aqueous solution of water-soluble degraded protein foaming agents which are alkali-metal salts of hydrolysis products obtained by hydrolyzing a protein selected from the class consisting of keratins, albumens, globulins, hemoglobins and seed meal proteins by means of an alkaline compound selected from the class consisting of oxides and hydroxides of the alkaline-earth metals and magnesium followed by replacing the alkaline-earth metal and magnesium introduced by the alkaline compound with an alkali-metal to form the alkali-metal salts of the hydrolysis products and a complex salt prepared from the reaction product of 3 to 5% of a metal introduced as a water-soluble metal salt, 2 to 12% of a fatty acid containing from 6 to 12 carbon atoms and an amine selected from the class consisting of an alkanolamine, a primary aliphatic amine, an alkylenediamine, a polyalkylenepolyamine and morpholine; said water-soluble metal salt being of a metal which forms a water-insoluble soap with said fatty acid, which mixture of the water-soluble metal salt and fatty acid is first separately solubilized in the water in which the water-soluble metal salt is dissolved prior to being mixed with the fatty acid by the addition of one of said amines; said amine being present in sufficient quantity to solubilize the fatty acid and water-soluble metal salt in the water in which the water-soluble metal salt is dissolved before being admixed with the fatty acid and amine and the resulting water-soluble complex introduced into said final foam stabilizing composition but in less than such excess as will prevent the precipitation of the foam-stabilizing composition when it is diluted with substantial quantities of water; the quantity of said water-soluble degraded protein foaming agents being such as will produce a foam when said foam-stabilizing composition is diluted with a sufficient quantity of water to produce a mixture of about 6% of said composition in water and the resulting mixture aspirated with air.

6. A foam stabilizing composition suitable for the preparation of fire extinguishing foams consisting essentially of an aqueous solution of water-soluble degraded protein foaming agents which are alkali-metal salts of hydrolysis products obtained by hydrolyzing a protein selected from the class consisting of keratins, albumens, globulins, hemoglobins and seed meal proteins by means of an alkaline compound selected from the class consisting of oxides and hydroxides of the alkaline-earth metals and magnesium followed by replacing the alkaline-earth metal and magnesium introduced by the alkaline compound with an alkali-metal to form the alkali-metal salts of the hydrolysis products and a complex salt prepared from the reaction product of 3 to 5% of a metal introduced as a water-soluble metal salt, 5 to 8% of a fatty acid containing from 6 to 12 carbon atoms and an amine selected from the class consisting of an alkanolamine, a primary aliphatic amine, an alkylenediamine, a polyalkylenepolyamine and morpholine; said water-soluble metal salt being of a metal which forms a water-insoluble soap with said fatty acid, which mixture of the water-soluble metal salt and fatty acid is first separately solubilized in the water in which the water-soluble metal salt is dissolved prior to being mixed with the fatty acid by the addition of one of said amines; said amine being present in sufficient quantity to solubilize the fatty acid and water-soluble metal salt in the water in which the water-soluble metal salt is dissolved before being admixed with the fatty acid and amine and the resulting water-soluble complex introduced into said final foam stabilizing composition but in less than such excess as will prevent the precipitation of the foam-stabilizing composition when it is diluted with substantial quantities of water; the quantity of said water-soluble degraded protein foaming agents being such as will produce a foam when said foam-stabilizing composition is diluted with a sufficient quantity of water to produce a mixture of about 6% of said composition in water and the resulting mixture aspirated with air.

7. A foam stabilizing composition suitable for the preparation of fire extinguishing foams consisting essentially of an aqueous solution of water-soluble degraded protein foaming agents which are alkali-metal salts of hydrolysis products obtained by hydrolyzing a protein selected from the class consisting of keratins, albumens, globulins, hemoglobins and seed meal proteins by means of an alkaline compound selected from the class consisting of oxides and hydroxides of the alkaline-earth metals and magnesium followed by replacing the alkaline-earth metal and magnesium introduced by the alkaline compound with an alkali-metal to form the alkali-metal salts of the hydrolysis products and a complex salt prepared from the reaction product of 3 to 5% of a metal introduced as a water-soluble metal salt, about 6% of a fatty acid containing from 6 to 12 carbon atoms and an amine selected from the class consisting of an alkanolamine, a primary aliphatic amine, an alkylenediamine, a polyalkylenepolyamine and morpholine; said water-soluble metal salt being of a metal which forms a water-insoluble soap with said fatty acid, which mixture of the water-soluble metal salt and fatty acid is first separately solubilized in the water in which the water-soluble metal salt is dissolved prior to being mixed with the fatty acid by the addition of one of said amines; said amine being present in sufficient quantity to solubilize the fatty acid and water-soluble metal salt in the water in which the water-soluble metal salt is dissolved before being admixed with the fatty acid and amine and the resulting water-soluble complex introduced into said final foam stabilizing composition but in less than such excess as will prevent the precipitation of the foam-stabilizing composition when it is diluted with substantial quantities of water; the quantity of said water-soluble degraded protein foaming agents being such as will produce a foam when said foam-stabilizing composition is diluted with a sufficient quantity of water to produce a mixture of about 6% of said composition in water and the resulting mixture aspirated with air.

8. A novel foam stabilizing composition as defined in claim 1, wherein the amine is an alkanolamine.

9. A novel foam stabilizing composition as defined in claim 1, wherein the amine is monoethanolamine.

10. A novel foam stabilizing composition as defined in claim 1, wherein the amine is diethanolamine.

11. A novel foam stabilizing composition as defined in claim 1, wherein the amine is triethanolamine.

12. A novel foam stabilizing composition as defined in claim 1, wherein the amine is n-butylamine.

13. A novel foam stabilizing composition as defined in claim 1, wherein the protein hydrolysate is that of blood.

14. A novel foam stabilizing composition as defined in claim 1, wherein the protein hydrolysate is that of hoof meal.

15. A novel foam stabilizing composition as defined in claim 1, wherein the protein hydrolysate is that of keratins.

16. A novel foam stabilizing composition as defined in claim 1, wherein the protein hydrolysate is that of soya bean meal.

17. A novel foam stabilizing composition as defined in claim 1, wherein the protein hydrolysate is that of horn meal.

18. A novel foam stabilizing composition as defined in claim 1, wherein the complex salt is prepared from a water-soluble salt of a metal selected from the class consisting of zinc, cadmium and copper.

19. A method of preparing a foam stabilizing composition suitable for the preparation of fire extinguishing foams which comprises mixing a sufficient quantity of a fatty acid containing from 6 to 12 carbon atoms to comprise from 2 to 12% of the composition with an amine selected from the class consisting of an alkanolamine, a primary aliphatic amine, an alkylenediamine, a polyalkylenepolyamine and morpholine with an aqueous solution of a water-soluble metal salt; said amine being present in sufficient quantity to solubilize the fatty acid and the water-soluble metal salt in the water present in the aqueous solution of the water-soluble metal salt; said water-soluble metal salt being of a metal which forms a water-insoluble soap with said fatty acid, which soap is solubilized by the addition of one of said amines; and said metal being present in sufficient quantity to comprise 1 to 8% of the composition; after a clear solution is obtained, the resulting mixture is added to a concentrated solution of water-soluble degraded protein foaming agents which are alkali-metal salts of hydrolysis products obtained by hydrolyzing a protein selected from the class consisting of keratins, albumens, globulins, hemoglobins and seed meal proteins by means of an alkaline compound selected from the class consisting of oxides and hydroxides of the alkaline-earth metals and magnesium followed by replacing the alkaline-earth metal and magnesium introduced by the alkaline compound with an alkali-metal to form the alkali-metal salts of the hydrolysis products; said amine being present in sufficient quantity to solubilize the fatty acid and water-soluble metal salt in the water in which the water-soluble metal salt is dissolved before being admixed with the fatty acid and amine and the resulting water-soluble complex introduced into said final foam stabilizing composition; the quantity of said water-soluble degraded protein foaming agents being such as will produce a foam when said foam-stabilizing composition is diluted with a sufficient quantity of water to produce a mixture of about 6% of said composition in water and the resulting mixture aspirated with air.

20. A method of producing fire extinguishing foam which comprises introducing gas with agitation into a stream of water containing therein a foam stabilizing composition consisting essentially of an aqueous solution of water-soluble degraded protein foaming agents which are alkali-metal salts of hydrolysis products obtained by hydrolyzing a protein selected from the class consisting of keratins, albumens, globulins, hemoglobins and seed meal proteins by means of an alkaline compound selected from the class consisting of oxides and hydroxides of the alkaline-earth metals and magnesium followed by replacing the alkaline-earth metal and magnesium introduced by the alkaline compound with an alkali-metal to form the alkali-metal salts of the hydrolysis products, and a complex salt prepared from the reaction product of 1 to 8% of a metal introduced as a water-soluble metal salt, 2 to 12% of a fatty acid containing from 6 to 12 carbon atoms and an amine selected from the class consisting of an alkanolamine, a primary aliphatic amine, an alkylenediamine, a polyalkylenepolyamine and morpholine; said water-soluble metal salt being of a metal which forms a water-insoluble soap with said fatty acid, which mixture of the water-soluble metal salt and fatty acid is first separately solubilized in the water in which the water-soluble metal salt is dissolved prior to being mixed with the fatty acid by the addition of one of said amines; said amine being present in sufficient quantity to solubilize the fatty acid and water soluble metal salt in the water in which the water-soluble metal salt is dissolved before being admixed with the fatty acid and amine and the resulting water-soluble complex introduced into said final foam stabilizing composition but in less than such excess as will prevent the precipitation of the foam-stabilizing composition when it is diluted with substantial quantities of water; the quantity of said water-soluble degraded protein foaming agents being such as will produce a foam when said foam-stabilizing composition is diluted with a sufficient quantity of water to produce a mixture of about 6% of said composition in water and the resulting mixture aspirated with air.

References Cited in the file of this patent

UNITED STATES PATENTS

| | | |
|---|---|---|
| 2,232,053 | Daimler et al. | Feb. 18, 1941 |
| 2,324,951 | Ratzer | July 20, 1943 |
| 2,405,438 | Levin | Aug. 6, 1946 |

OTHER REFERENCES

Mellor's Modern Inorganic Chemistry (1939), Longmans, Green and Company, New York, pages 590–591.